(12) United States Patent
Uesugi

(10) Patent No.: US 8,664,827 B2
(45) Date of Patent: Mar. 4, 2014

(54) ELECTRIC POWER GENERATION DEVICE AND ELECTRONIC INSTRUMENT

(75) Inventor: Yoshinori Uesugi, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 157 days.

(21) Appl. No.: 13/412,902

(22) Filed: Mar. 6, 2012

(65) Prior Publication Data

US 2012/0228964 A1   Sep. 13, 2012

(30) Foreign Application Priority Data

Mar. 9, 2011 (JP) ................................ 2011-051225
Dec. 12, 2011 (JP) ................................ 2011-270790

(51) Int. Cl.
*H02N 1/00* (2006.01)

(52) U.S. Cl.
USPC .......................................... 310/309; 310/81

(58) Field of Classification Search
USPC .................................................. 310/309, 81
See application file for complete search history.

(56) References Cited

U.S. PATENT DOCUMENTS

| | | | | |
|---|---|---|---|---|
| 2,663,802 A * | 12/1953 | Ohmart | ........................ | 250/392 |
| 4,227,086 A | 10/1980 | Dreyfus et al. | | |
| 8,164,231 B2 * | 4/2012 | Mabuchi | ........................ | 310/309 |
| 2008/0048521 A1 * | 2/2008 | Mabuchi et al. | .............. | 310/309 |
| 2008/0111444 A1 * | 5/2008 | Mabuchi | ........................ | 310/309 |
| 2008/0122313 A1 * | 5/2008 | Mabuchi et al. | .............. | 310/309 |
| 2009/0236932 A1 * | 9/2009 | Matsubara | .................... | 310/309 |
| 2012/0181897 A1 | 7/2012 | Masaki et al. | | |

FOREIGN PATENT DOCUMENTS

| | | |
|---|---|---|
| JP | 53-141081 A | 12/1978 |
| JP | 7-199955 A | 8/1995 |
| JP | 2004-180375 A | 6/2004 |
| JP | 2006-180450 A | 7/2006 |
| JP | 2008-129202 A | 6/2008 |
| JP | 2010-273509 A | 12/2010 |
| JP | 2011-045194 A | 3/2011 |
| JP | 2011-069402 A | 4/2011 |
| JP | 2012-152010 A | 8/2012 |

OTHER PUBLICATIONS

Japanese Office Action dated Mar. 12, 2013 (and English translation thereof) in counterpart Japanese Application No. 2011-270790.

* cited by examiner

*Primary Examiner* — Thanh Lam
(74) *Attorney, Agent, or Firm* — Holtz, Holtz, Goodman & Chick

(57) ABSTRACT

Disclosed is an electric power generation device comprising: a pair of electrodes arranged opposite to each other; and an electret member that is arranged between the pair of electrodes to be spaced apart from the pair of electrodes, and is provided to be movable in a direction of a perpendicular axis passing through the pair of electrodes.

9 Claims, 14 Drawing Sheets

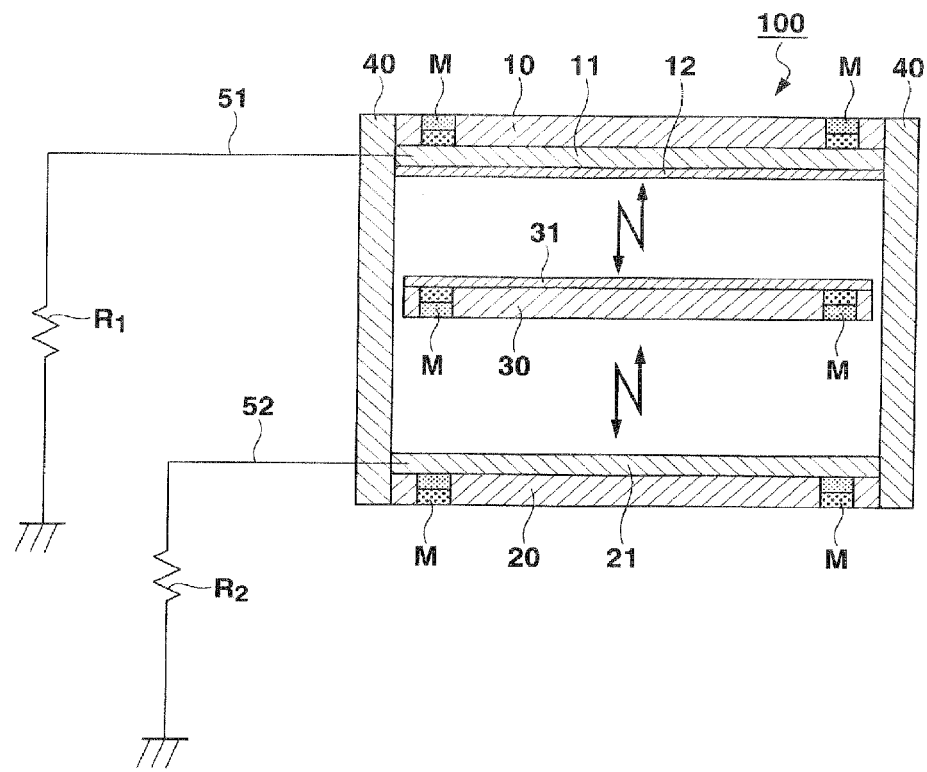
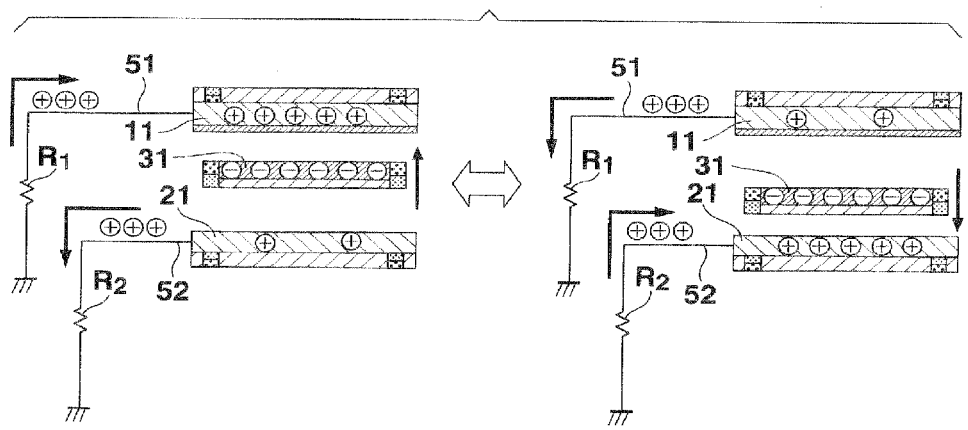

ELECTRIC POWER GENERATION DEVICE AND ELECTRONIC INSTRUMENT

CROSS-REFERENCE TO RELATED APPLICATIONS

This application is based upon and claims the benefit of priority under 35 USC 119 of Japanese Patent Application Nos. 2011-051225 and 2011-270790, the entire disclosure of which, including the description, claims, drawings, and abstract, is incorporated herein by reference in its entirety.

BACKGROUND OF THE INVENTION

1. Field of the Invention

The present invention relates to an electric power generation device and to an electronic instrument using the same.

2. Background Art

Heretofore, an electric power generation device of an electrostatic induction type has been known, in which strap-like electrets and comb teeth-like operation electrodes are arranged opposite to each other, and the operation electrodes vibrate in a horizontal direction with respect to the electrets, whereby electric power generation by electrostatic induction is enabled (for example, refer to Japanese Patent Laid-Open Publication No. 2006-180450).

In this electric power generation device, when electrets 3 and operation electrodes 1 come close to each other as shown in FIG. 9A, electric charges are induced to the operation electrodes 1. Then, when the operation electrodes 1 and the electrets 3 are moved relatively to each other in the horizontal direction from this state, then as shown in FIG. 9B, an induced electric charge amount of the operation electrodes 1 is changed, and an amount of such a change is outputted as a current to an external circuit (load R).

However, in the case of the above-described conventional technology, the electrets 3 are formed on an underlying electrode 2, and accordingly, a major part of electric flux lines emitted from the electric charges of the electrets 3 goes toward the underlying electrode 2. Hence, only a very small part of the electric flux lines goes toward the operation electrodes 1 as important targets, and accordingly, the electric charges induced to the operation electrodes 1 are very small in comparison with those induced to the underlying electrode 2, and there has been a problem that surface electric charges of the electrets 3 cannot be utilized effectively.

Specifically, as shown in FIG. 10, when a surface electric charge density of the electrets 3 is σ, a density of the electric charges induced to the operation electrodes 1 is σ1, and a density of the electric charges induced to the underlying electrode 2 is σ2, then the densities of the electric charges induced to the operation electrodes 1 and the underlying electrode 2 in the event where the operation electrodes 1 and the electrets 3 come closest to each other and are oppose to each other right in front are represented individually by the following formulae:

$$\sigma1 = -\sigma \cdot (d_2')/(d_1+d_2')$$

$$\sigma2 = -\sigma \cdot (d_1)/(d_1+d_2')$$

$$d_2' = d_2/\varepsilon_s$$

($\varepsilon_s$ is a relative dielectric constant of the electrets)

A usual film thickness $d_2$ of the electrets 3 is a whole lot smaller in comparison with a distance $d_1$ thereof with the operation electrodes 1. For example, when $d_2$ is equal to 10 μm, $d_1$ is equal to 100 μm, and $\varepsilon_s$ is equal to 2, then in the atmosphere, σ1 becomes substantially equal to −0.05σ, and σ2 becomes substantially equal to −0.95σ. In this example, the electric charges induced to the operation electrodes 1 becomes approximately 1/19 of the electric charges induced to the underlying electrode 2.

As discussed above, in comparison with the electric charges induced to the underlying electrode 2, the electric charges which are induced to the operation electrodes 1 and actually contribute to power generation are small, and the surface electric charges of the electrets 3 are not utilized effectively.

Moreover, the maximum electric power $P_{max}$ that can be taken out from this power generation device is represented by the following general formula (1), and an output thereof is proportional to a square of the surface electric charge density of the electrets 3.

Furthermore, the surface electric charge density σ of the electrets 3 is represented by the following general formula (2), and is proportional to a surface potential V of the electrets 3.

Therefore, an electric power generation amount is increased as the surface potential of the electrets 3 is being enhanced.

$$P_{max} = \frac{\sigma^2 \cdot n \cdot A \cdot 2\pi f}{\frac{\varepsilon_s \cdot \varepsilon_0}{d_2}\left[\frac{\varepsilon_s \cdot d_1}{d_2} + 1\right]} \tag{1}$$

$$\sigma = \varepsilon_s \cdot \varepsilon_0 \cdot \frac{V}{d_2} \tag{2}$$

σ: surface electric charge density of electrets
n: number of poles, that is, number of electrets
A: maximum area where operation electrodes and electrets overlap each other
f: frequency of reciprocating motion of operation electrodes
$d_2$: thickness of electrets
$d_1$: distance between electrets and operation electrodes
$\varepsilon_s$: relative dielectric constant of electrets
$\varepsilon_0$: relative dielectric constant of vacuum
V: surface potential of electrets However, in the case where the electrets 3 are thinned into such a strap shape and a wiring density thereof is enhanced as in the conventional technology, then in the event of implanting electrons into the electrets 3 by corona discharge, an electric field of end portions of the strap-like electrets 3 is intensified by an edge effect, and the electrets 3 repel the electrons. Hence, it becomes difficult to charge the electrets 3, and there has been a problem that it is difficult to increase the electric power generation amount since a high surface potential cannot be applied to the electrets 3.

Moreover, problems described as follows have been inherent in the electret electric power generation device (electric power generation device of electrostatic induction type) of the conventional technology.

Since the operation electrodes 1 are formed into the comb teeth shape, a surface area of surfaces of the operation electrodes 1 which generate the induced electric charges, the surfaces being opposed to the electrets 3, is reduced, and electric power generation efficiency with respect to a device area is poor.

It is necessary to draw wires from the operation electrodes 1 which move in a vibration manner, and a device structure becomes complicated in order to stably take out electric power.

As understood from the general formulae (1) and (2), a narrower gap ($d_1$) between the electrets 3 and the operation electrodes 1 brings about a large effect for the electric power generation. However, the narrower the gap is, the larger the electrostatic suction force between the electrets 3 and the operation electrodes 1 becomes, and accordingly, a mechanism comes to be required, which maintains the gap accurately so that the electrets 3 and the operation electrodes 1 cannot contact each other. Therefore, the device structure becomes complicated.

BRIEF SUMMARY OF THE INVENTION

According to one aspect of the present invention, there is provided an electric power generation device comprising:
a pair of electrodes arranged opposite to each other; and
an electret member that is arranged between the pair of electrodes to be spaced apart from the pair of electrodes, and is provided to be movable in a direction of a perpendicular axis passing through the pair of electrodes.

According to another aspect of the present invention, there is provided an electronic instrument comprising:
a battery that stores electric power generated by the electric power generation device according to claim 1, wherein
the electronic instrument operates by using the electric power stored in the battery.

According to still another aspect of the present invention, there is provided an electronic instrument comprising:
a battery that stores electric power generated by the electric power generation device according to claim 1; and
an electric power output unit that supplies other electronic instruments with the electric power stored in the battery.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention, wherein:

FIGS. 4A and 4B are explanatory views showing the electric power generation device: FIG. 4A shows vibrations of an electret film; and FIG. 4B shows movement of electric charges, which corresponds to the vibrations of the electret film;

FIG. 9A shows a state where electric charges are induced; and FIG. 9B shows a state where the induced electric charges flow to an external load;

DETAILED DESCRIPTION OF THE INVENTION

Embodiments of the present invention will be explained with reference to the drawings.

A description is made below of details of an electric power generation device according to the present invention. Note that, though a variety of technically preferable limitations are imposed on embodiments to be described below for the purpose of embodying the present invention, the scope of the invention is not limited to the following embodiments and illustrated examples.

Figure 1:
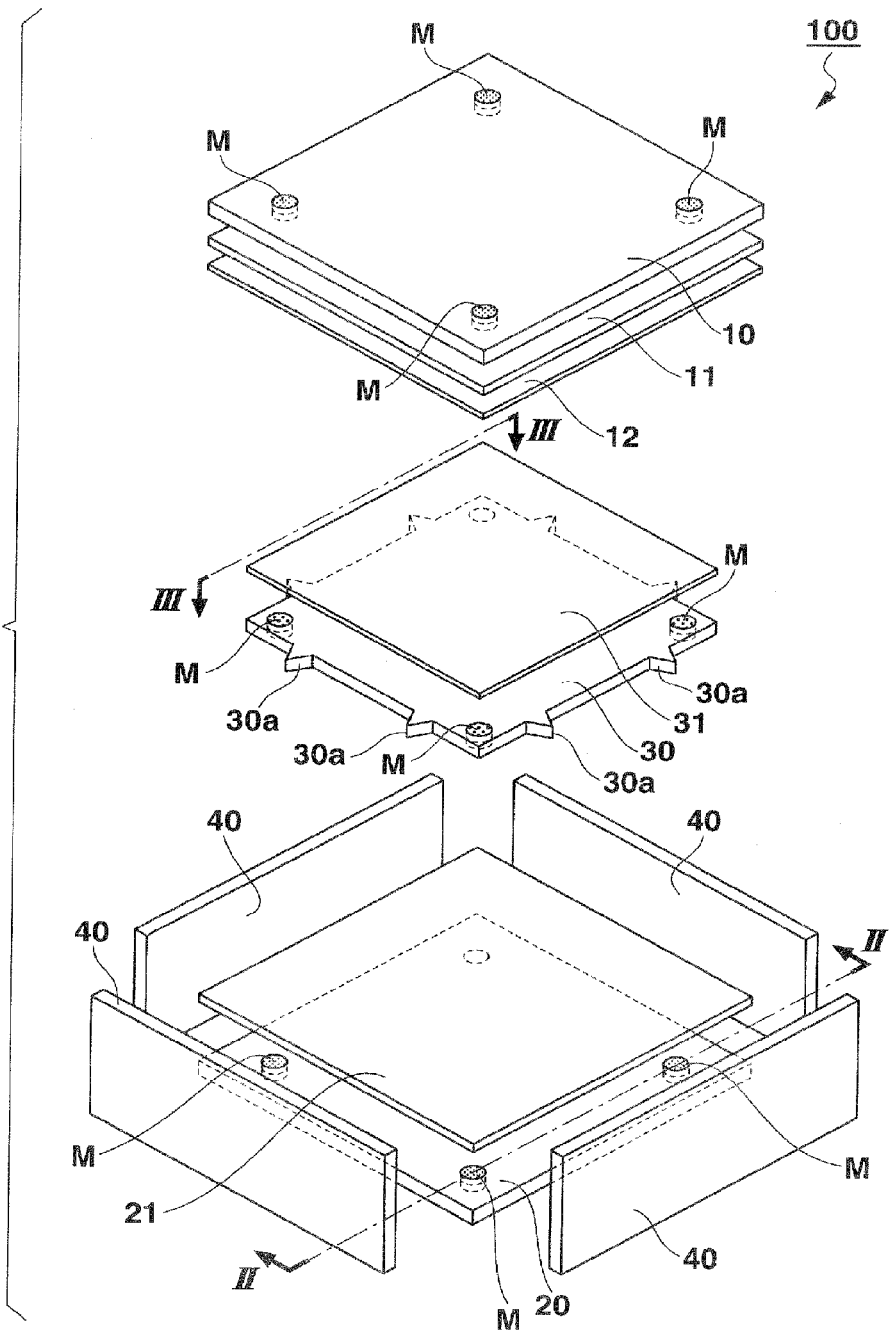
FIG. 1 is an exploded perspective view showing an electric power generation device according to an embodiment of the present invention.
Figure 2:
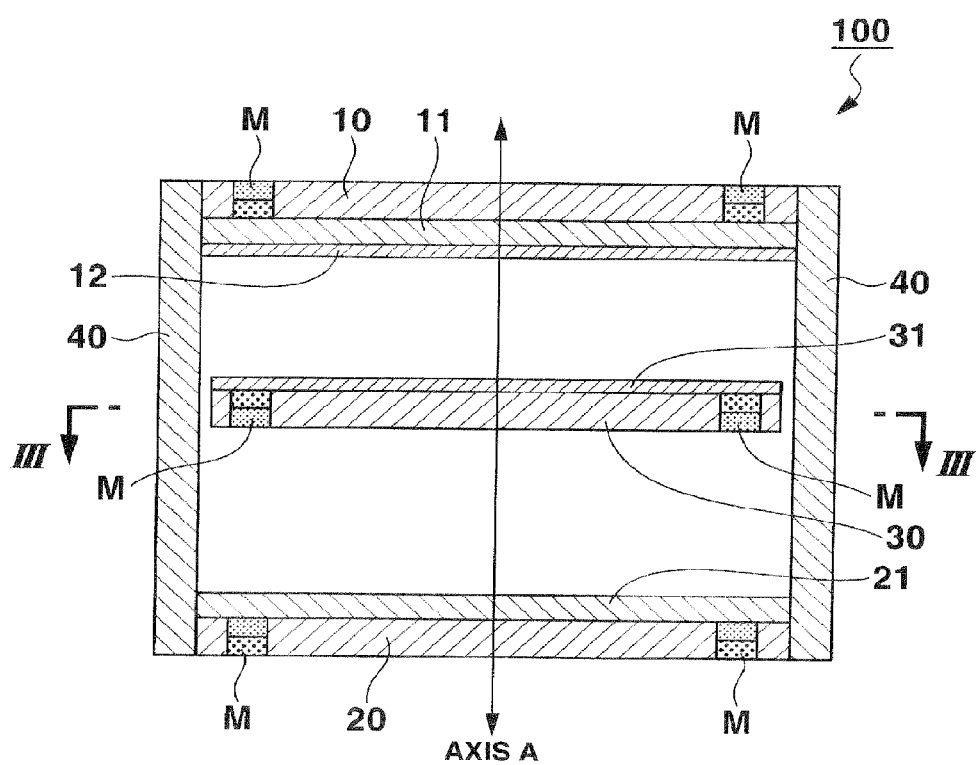
FIG. 2 is a longitudinal cross-sectional view showing the electric power generation device when viewed from a cutting plane line II-II of FIG. 1.
Figure 3:
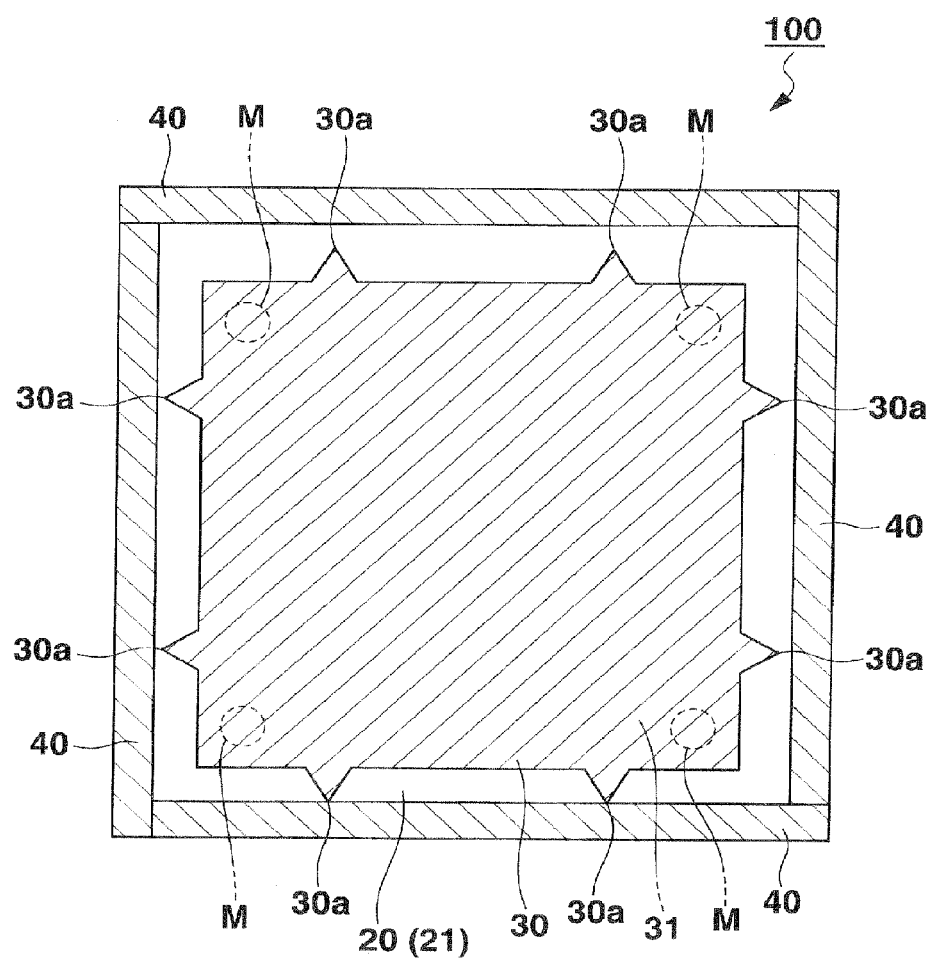
FIG. 3 is a lateral cross-sectional view showing the electric power generation device when viewed from a cutting plane line III-III of FIG. 1.

FIG. 1 is an exploded perspective view showing an electric power generation device according to the present invention. FIG. 2 is a longitudinal cross-sectional view showing the electric power generation device, taken along a cutting plane line II-II of FIG. 1. FIG. 3 is a lateral cross-sectional view showing the electric power generation device, taken along a cutting plane line III-III of FIG. 1.

As shown in FIGS. 1 to 3, an electric power generation device 100 is a device, in which an outer frame (frame) holds a cabinet that exhibits a substantially rectangular parallelepiped shape and includes: an upper substrate 10 and a lower substrate 20 which are a pair of fixed substrates; and four side plates 40 as holding members arranged on four side surfaces so as to hold the upper substrate 10 and the lower substrate 20 at a predetermined interval.

The upper substrate 10, the lower substrate 20 and the side plates 40 are plate-like members made of an insulating material, and in this embodiment, are assembled with one another so as to form a hermetically sealed structure that prevents entrance of humidity into an inside of the cabinet.

This electric power generation device 100 includes a pair of electrodes 11 and 21 arranged opposite to each other. The electrode 11 as one in the pair is provided on a lower surface (inner surface side) of the upper substrate 10, the electrode 21 as the other in the pair is provided on an upper surface (inner surface side) of the lower substrate 20, and the upper substrate 10 and the lower substrate 20, which make a pair, support the pair of electrodes 11 and 21. The pair of electrodes 11 and 21 are electrodes which individually exhibit a rectangular shape.

Moreover, a discharge prevention film 12 is provided on a surface (inner surface side) of the electrode 11 as one in the pair, which is arranged on the lower surface of the upper substrate 10. The discharge prevention film 12 is a film-like member made of an insulating material. Note that, in order to suitably prevent aerial discharge from the electrode 11, the discharge prevention film 12 is an insulating film material free from pinholes.

Moreover, a wire 51 for taking out electric charges induced to the electrode 11 as one in the pair in the electric power generation device 100 is connected to the electrode 11, and a wire 52 for taking out electric charges induced to the electrode 21 as the other in the pair therein is connected to the electrode 21 (refer to FIG. 4A).

Moreover, the electric power generation device 100 includes an electret film 31. The electret film 31 is arranged between the pair of electrodes 11 and 21 so as to be spaced apart from the pair of electrodes 11 and 21 concerned, and is provided so as to be movable in a direction that goes along an axis passing through the pair of electrodes 11 and 21, that is, as shown in FIG. 2, in a direction of an axis A (perpendicular axis) perpendicular to a surface that belongs to the electrode 11 and is opposed to the electrode 21 and to a surface that belongs to the electrode 21 and is opposed to the electrode 11. The electret film 31 is provided on an upper surface of a movable substrate 30 arranged between the upper substrate 10 and the lower substrate 20, and the movable substrate 30 supports the electret film 31.

The movable substrate 30 is a plate-like member made of an insulating material. Moreover, protruding pieces 30a, which protrude from peripheral edges of the substantially rectangular movable substrate 30 so that a planar shape thereof can be substantially triangle, more preferably, that a three-dimensional shape thereof can be a substantially conical shape, are integrally formed two by two on the respective sides.

The electret film 31 is a member that exhibits a rectangular shape and is made, for example, of an electric charge holding member capable of semipermanently holding positive and negative electric charges implanted thereinto by corona discharge.

As the electric charge holding member usable as this electret film 31, for example, there can be mentioned: a polymer electric charge holding member such as polypropylene (PP), polyethylene terephthalate (PET), polyvinyl chloride (PVC), polystyrene (PS), polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer (ETFE), polyvinylidene difluoride (PVDF), polychlorotrifluoroethylene (PCTFE), ethylene-chlorotrifluoroethylene copolymer (ECTFE), and polyvinyl fluoride (PVF); and an inorganic electric charge holding member such as silicon oxide ($SiO_2$) and silicon nitride (SiN).

Specifically, "CYTOP" made by Asahi Glass Co., Ltd., and the like can be applied as the electret film 31 of the present invention.

Moreover, in the upper substrate 10, lower substrate 20 and movable substrate 30 of the electric power generation device 100, magnets M are provided on four corners of each of the substrates concerned so that the same poles can face to each other. The respective magnets M are replaceably provided on each of the substrates.

Specifically, on four corners of the movable substrate 30, magnets M are provided, in which S poles are directed to the upper substrate 10 side, and N poles are directed to the lower substrate 20 side. The respective magnets M are embedded into attachment holes formed in the movable substrate 30, and are arranged substantially flush with the movable substrate 30.

Furthermore, on four corners of the upper substrate 10, magnets M are provided, in which S poles are directed to the movable substrate 30 side. The respective magnets M are embedded into attachment holes formed in the upper substrate 10, and are arranged substantially flush with the upper substrate 10.

Moreover, on four corners of the lower substrate 20, magnets M are provided, in which N poles are directed to the movable substrate 30 side. The respective magnets M are embedded into attachment holes formed in the lower substrate 20, and are arranged substantially flush with the lower substrate 20.

Then, a configuration is adopted so that the movable substrate 30 can float apart from the upper substrate 10 and the lower substrate 20 by repulsive force of the magnets M, and that the electret film 31 provided in the movable substrate 30 can move and vibrate in the direction of the axis passing through the pair of electrodes 11 and 21.

Note that a tip end of any protruding piece 30a among the plurality (eight in this embodiment) of protruding pieces 30a provided on the movable substrate 30 abuts against an inner surface of the side plate 40, and this movable substrate 30 floats between the upper substrate 10 and the lower substrate 20 in a state of being brought into point contact with the side plate 40. Note that tip ends of all the protruding pieces 30a may be brought into point contact with the side plates 40.

When external vibrations act on the electric power generation device 100 configured as described above, then as shown in FIG. 4A, the electret film 31 integral with the movable substrate 30 that is floating by the repulsive force of the magnets M moves and vibrates in the direction of the axis passing through the pair of electrodes 11 and 21.

In the event where this movable substrate 30 moves (vibrates) up and down together with the electret film 31, the movable substrate 30 is brought into extremely slight contact with the side plate 40 so as to be brought into point contact therewith. Accordingly, friction hardly occurs between the movable substrate 30 and the side plate 40. That is to say, in the event where the external vibrations act on the electric power generation device 100, motions of the up and down vibrations of the movable substrate 30 are not inhibited by the friction. Accordingly, minute external vibrations are converted into the up and down vibrations of the movable substrate 30.

Note that, for the purpose of further preventing the occurrence of the friction between the movable substrate 30 and the side plates 40, preferably, at least one of the movable substrate 30 and the side plate 40 is formed of an insulating material with a small coefficient of friction, such as polytetrafluoroethylene (Teflon (registered trademark)).

Next, a description is made of a mechanism of the electric power generation in the electric power generation device 100 of this embodiment.

As shown in FIG. 4A, as the external vibrations are acting on the electric power generation device 100, the movable substrate 30 that is floating by the repulsive force of the magnets M vibrates up and down. Then, the electret film 31 integral with the movable substrate 30 vibrates so as to move up and down in the direction of the axis passing through the pair of electrodes 11 and 21.

Then, as shown in FIG. 4B, in the case where the electret film 31 of the electric power generation device 100 holds negative electric charges, in the event where the electret film 31 vibrates up and down, positive electric charges are electrostatically induced to the electrode on the side to which the electret film 31 comes close, and on the side from which the electret film 31 separates apart, positive electric charges are discharged.

Specifically, in the event where the electret film 31 integral with the movable substrate 30 comes close to the upper substrate 10 side, positive electric charges are electrostatically induced to the electrode 11 through the wire 51. Meanwhile, the induced positive electric charges are discharged from the electrode 21 on the lower substrate 20 side through the wire 52, and electric power is supplied to an external load $R_2$.

In a similar way, in the event where the electret film 31 integral with the movable substrate 30 comes close to the lower substrate 20 side, positive electric charges are electrostatically induced to the electrodes 21 through the wire 52. Meanwhile, the induced positive electric charges are discharged from the electrode 11 on the upper substrate 10 side through the wire 51, and electric power is supplied to an external load $R_1$.

As described above, an induced electric charge amount is changed in response to the vibrations of the electret film 31, and amounts of such a change can be taken out as currents to the external loads $R_1$ and $R_2$. Note that, since the induction and discharge of the electric charges become reverse operations between the electrode 11 and the electrode 21, currents with inverted phases are taken out therefrom.

Next, a description is made of an electric power generation amount in the electric power generation device 100 of this embodiment.

Figure 5:
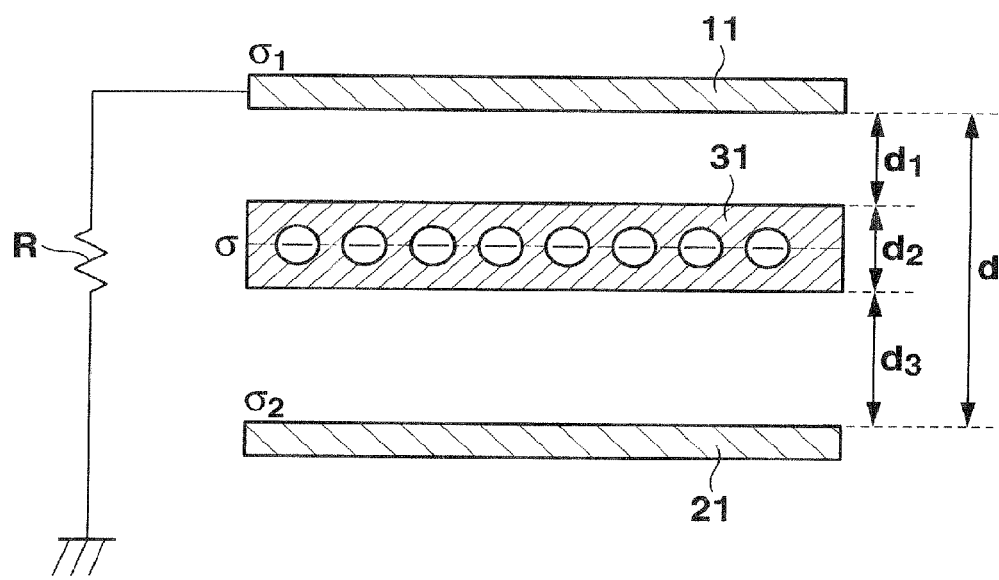
FIG. 5 is an explanatory view for explaining an electric power generation amount of the electric power generation device.

As shown in FIG. 5, when a distance between the electret film 31 and the electrode 11 is $d_1$, a distance between the electret film 31 and the electrode 21 is $d_3$, a thickness of the electret film 31 is $d_2$, and a relative dielectric constant of the electret film 31 is $\in_s$, and if it is assumed that the electric charges of the electret film 31 are distributed in a center in a thickness direction of the film concerned with an electric charge density σ, then an electric charge density σ1 is represented by the following general formula (3):

$$\sigma_1 = -\sigma \cdot \frac{d_3 + d_2/(2\varepsilon_s)}{d_1 + d_2/\varepsilon_s + d_3} \quad (3)$$

If it is assumed that this electret film 31 vibrates up and down with an angular frequency ω, then such gaps $d_3$ and $d_1$ are represented by the following general formulae (4) and (5):

$$d_3 = \frac{d-d_2}{2}\{\sin(\omega t) + 1\} \quad (4)$$

$$d_1 = \frac{d-d_2}{2}\{-\sin(\omega t) + 1\} \quad (5)$$

Hence, such a density σ1 of the electric charges induced to the electrode 11 is represented by the following general formula (6):

$$\sigma_1 = -\frac{\sigma}{2} \frac{(d-d_2)\{\sin(\omega t)+1\} + d_2/\varepsilon_s}{d-d_2 + d_2/\varepsilon_s} \quad (6)$$

Here, when an area of the electrode 11 is S, a total amount $Q_1$ of the electric charges induced to the electrode 11 is represented by the following general formula (7):

$$Q_1 = \sigma_1 \cdot S \quad (7)$$

Then, a resultant obtained by differentiating such a total electric charge amount $Q_1$ by a time becomes a current i that is inputted to and outputted from the electrode 11.

$$i = dQ_1/dt$$

$$\therefore i = -(\sigma/2) \cdot S \cdot \omega \cdot k \cdot \cos(\omega t)$$

$$k = (d-d_2)/(d-d_2 \cdot (1-1/\in_s))$$

Hence, output electric power P is represented by the following general formula (8):

$$P = i^2 \cdot R \quad (8)$$
$$= R \cdot \sigma^2 \cdot S^2 \cdot \omega^2 \cdot k^2 \cdot \cos^2 \cdot (\omega t)/4$$

As understood from the above-described general formula (8), it is understood that the power generation amount in the electrode 11 of the electric power generation device 100 is proportional to a square of the electric charge density σ of the electret film 31, a square of the electrode surface S, and a square of the frequency ω.

Moreover, in the electric power generation device 100, the electric power generation in both of the electrode 11 and the electrode 12 is possible, and accordingly, it can be expected to obtain a power generation amount that is twice that in the general formula (8).

As described above, the electric power generation device 100 according to the present invention includes the electret film 31 on the movable substrate 30 spaced apart from the pair of electrodes 11 and 21. Accordingly, all of electric flux lines emitted from the electret film 31 charged by being implanted with the electric charges can be directed toward the electrode 11 and the electrode 12. Therefore, surface electric charges of the electret film 31 can be utilized effectively, and power generation efficiency thereof can be enhanced.

Moreover, in the case where comparison is made between a conventional electric power generation device and the electric power generation device 100 of the present invention, in each of which the electret film is formed on the movable substrate with the same area, then the electric power generation device 100 of the present invention forms the electret film 31 into the rectangular shape, whereby, in comparison with the conventional electric power generation device using the electret thinned into the strap shape, implantation efficiency of the electric charges into the electret film is enhanced, a surface potential thereof can be enhanced, and electric power generation capability thereof can be enhanced.

Furthermore, in the case where comparison is made between the conventional electric power generation device and the electric power generation device 100 of the present invention, in each of which the electrodes are formed on the substrates with the same area, then the electric power generation device 100 of the present invention forms the pair of electrodes 11 and 21 into the rectangular shape, whereby a large electrode area can be ensured more than in the conventional electric power generation device including the conventional comb teeth-like electrodes, and accordingly, the induced electric charge amount is increased, and the electric power generation capability can be enhanced.

Moreover, the electrodes 11 and 21 are provided above and below the electret film 31, whereby the electrode area twice that of the one electret film 31 can be ensured, and accordingly, the electric power generation capability thereof can be enhanced.

Furthermore, a vibration structure is adopted, in which the electret film 31 is vibrated by using such magnetic floating force by the magnets M. In such a way, even in the case where the electric power generation device is used for a long period of time, such a vibration frequency thereof is hardly changed, and accordingly, durability of the vibration structure is enhanced, and it becomes possible to perform stable electric power generation for a long period of time.

Moreover, the magnets M are replaceably provided for each of the substrates. Accordingly, the magnets M are replaced, and magnetic force intensity of the magnets M is changed, whereby a resonant frequency at which the movable substrate 30 and the electret film 31 vibrate up and down can be changed with ease. Then, the resonant frequency is adjusted to an appropriate resonant frequency in response to an installation spot and usage purpose of the electric power generation device, whereby it is made possible to appropriately adjust the vibrations of the movable substrate 30 and the electret film 31.

For example, in the case of using, for the electric power generation, vibrations of a passenger at a walking time, the magnets M are replaced by magnets M corresponding to a vibration cycle of several hertz (Hz), and moreover, in the case of using, for the electric power generation, vibrations of an automobile running on an overhead road of a highway or the like, the magnets M are replaced by magnets M corresponding to a vibration cycle of 20 to 30 Hz, whereby the electric power generation device can cope with the respective vibration conditions.

Moreover, the wires 51 and 52 for taking out the electric charges induced to the pair of electrodes 11 and 21 by the electrostatic induction corresponding to the movement of the electret film 31 are connected to the electrodes 11 and 21, respectively. Accordingly, it is not necessary to draw the wires from the vibrating electrodes as in the electric power generation device as in the conventional technology. Therefore, the device structure becomes simple, it becomes easy to takeout the electric power, and reliability of the electric power generation is enhanced.

Moreover, if a place at which the electric power generation device 100 is installed is, for example, iron rod/iron frame portions of the overhead road of the highway or the like, a railroad bridge of a railway, and the like, then the electric power generation device 100 can be installed by being pasted by magnetic force of the magnets M built in the electric power generation device 100. Accordingly, it is not necessary to use a fixing jig, an adhesive and the like, and installation work for the electric power generation device 100 becomes easy.

Moreover, the discharge prevention film 12 is provided on the surface opposed to the electret film 31 without interposing the movable substrate 30 therebetween, the surface being one of the inner surface-side surfaces which the pair of electrodes 11 and 21 individually include. Accordingly, the aerial discharge from the electrode 11 can be suitably prevented. Moreover, even if the vibrations become too large, the electret film 31 can be prevented from contacting one of the electrodes, and accordingly, the electric charges accumulated in the electrode can be prevented from being extinguished by the contact between the electret film and the electrode.

As described above, the electric power generation device 100 according to the present invention can be said to be an electric power generation device that can generate electric power efficiently with a simple configuration.

Note that the present invention is not limited to the above-described embodiment.

Figure 6:
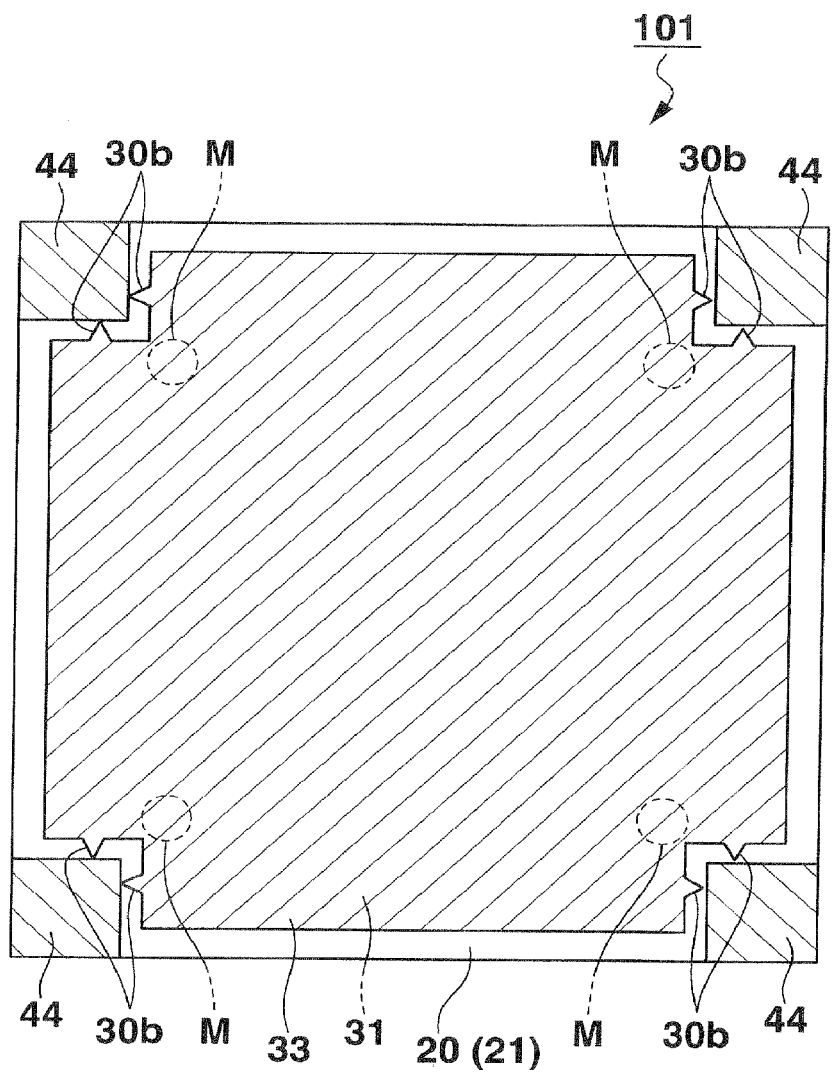
FIG. 6 is a lateral cross-sectional view showing a modification example of the electric power generation device.

For example, as in an electric power generation device 101 shown in FIG. 6, in the case where holding members which hold the upper substrate 10 and the lower substrate 20 at a predetermined interval are four holding columns 44 provided so as to individually connect four corners of the upper substrate 10 and four corners of the lower substrate 20 to each other, then protruding pieces 30b which protrude in a substantially triangular shape (preferably, a substantially conical shape) from edges of a movable substrate 33 with a substantially cross shape may be provided so as to abut against the holding columns 44.

Even in the electric power generation device 101 as described above, the movable substrate 33 is brought into extremely slight contact with the holding columns 44 so as to be brought into point contact therewith. Accordingly, friction hardly occurs between the movable substrate 33 and the holding columns 44. Therefore, in the event where the external vibrations act on the electric power generation device 101, motions of the up and down vibrations of the movable substrate 33 are not inhibited by the friction. Accordingly, minute external vibrations are also transmitted to the movable substrate 33, and are converted into the up and down vibrations of the movable substrate 33 and the electret film 31. Moreover, by adopting such a configuration, the electrode area of the pair of electrodes 11 and 21 and the surface area of the electret film can be widely ensured.

Figure 7:
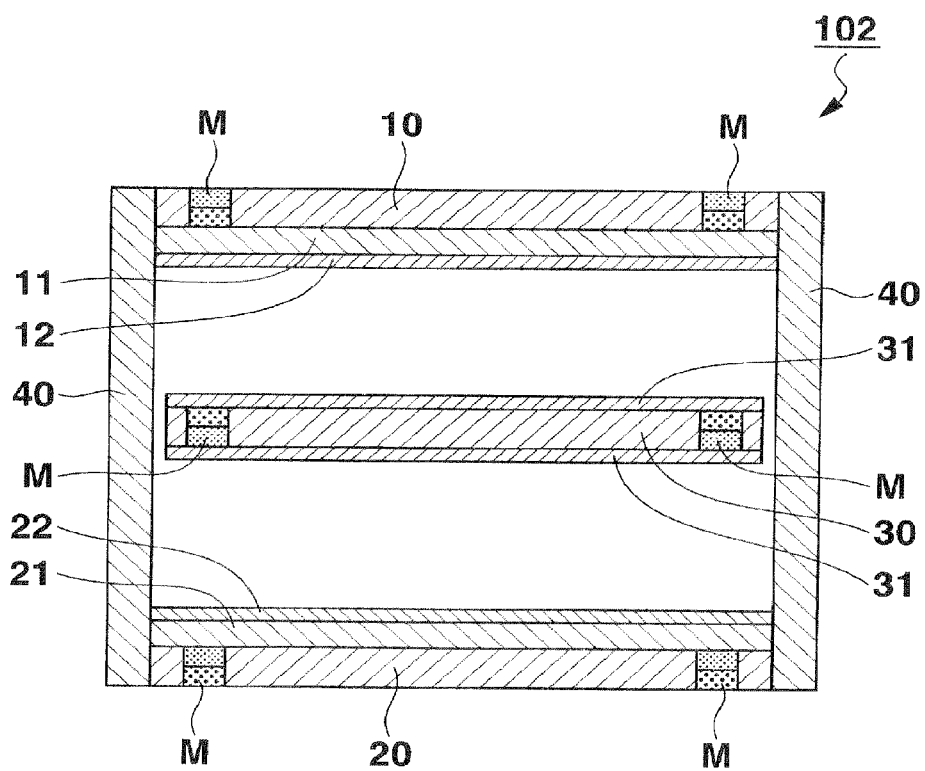
FIG. 7 is a longitudinal cross-sectional view showing a modification example of the electric power generation device.

Moreover, as in an electric power generation device 102 shown in FIG. 7, the electret films 31 may be provided on both upper and lower surfaces of the movable substrate 30. In this case, a discharge prevention film 22 similar to the discharge prevention film 12 provided on the surface (lower surface side) of the upper substrate 10-side electrode 11 as one in the pair is provided also on the surface (upper surface side) of the electrode 21 as the other in the pair, which is arranged on the upper surface of the lower substrate 20.

In the electric power generation device 102 as described above, the electret film 31 can approach both of the upper and lower electrodes 11 and 21 individually by substantially the same distance, and electric power generation efficiency becomes substantially the same between the electrode 11 and the electrode 21.

Figure 8:
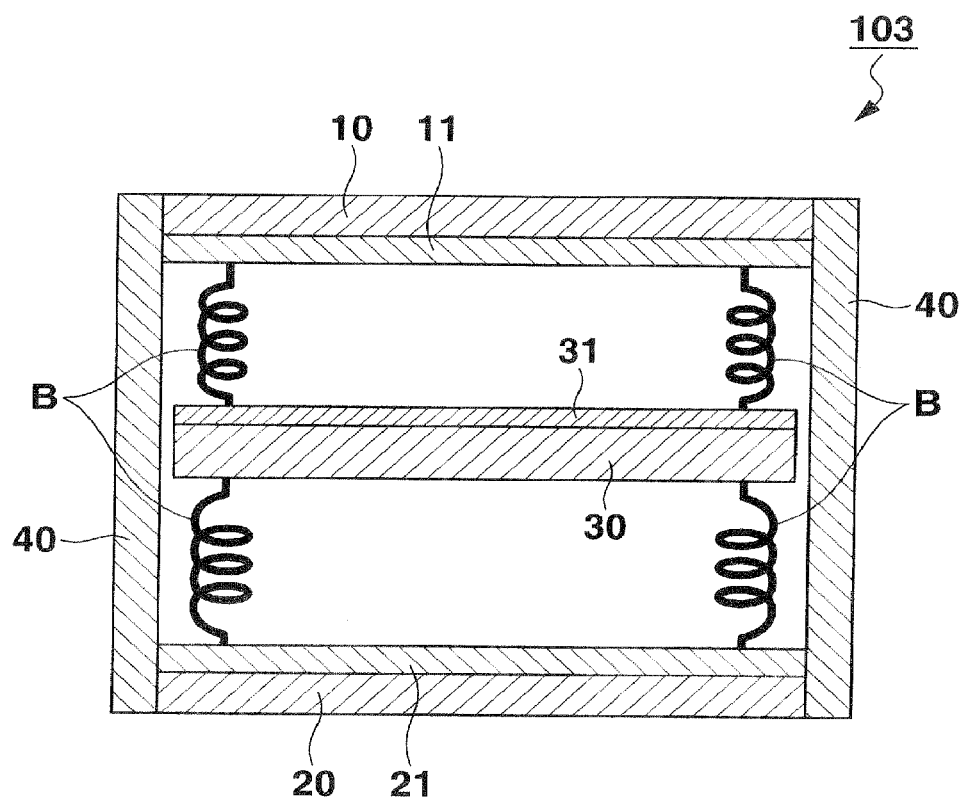
FIG. 8 is a longitudinal cross-sectional view showing a modification example of the electric power generation device.
Figure 9A:
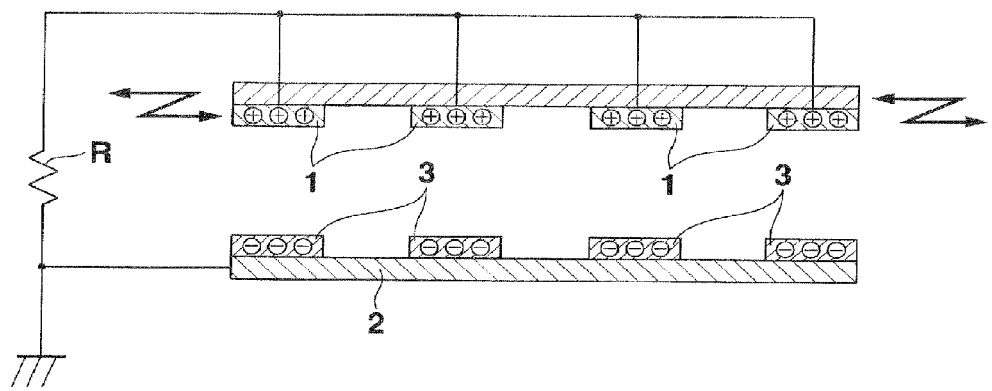
FIGS. 9A and 9B are explanatory views showing a conventional electric power generation device.
Figure 9B:
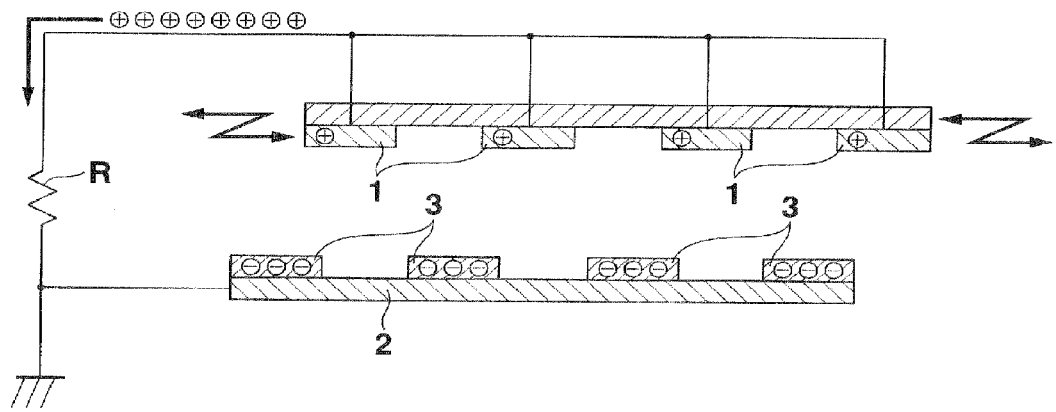
Figure 10:
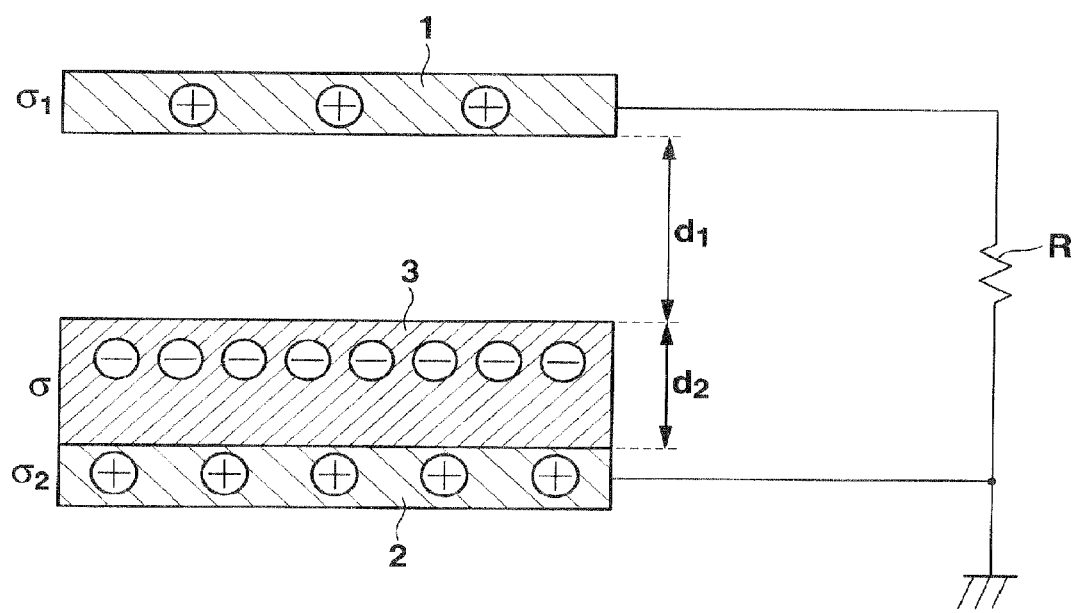
FIG. 10 is an explanatory view for explaining an electric power generation amount of the conventional electric power generation device.

Moreover, as in an electric power generation device 103 shown in FIG. 8, not the vibration structure utilizing the magnetic floating force by the magnets M but a vibration structure may be adopted, in which the movable substrate 30 and the electret film 31 are elastically supported by coil springs B which are spring members serving as elastic members. For the coil springs B, arbitrary shape/material can be applied, and for example, coil springs made of an insulating material can be used.

In the electric power generation device 103 as described above, the coil springs B are interposed between the electrode 11 and the electret film 31, and accordingly, a certain level or more of an air layer can be ensured between the electrode 11 and the electret film 31. By this air layer, the electrode 11 and the electret film 31 do not come close to each other to an extent where the discharge is started, and the discharge can be prevented. Hence, the discharge prevention film 12 becomes unnecessary.

Note that, in the above-described embodiment, the magnets M are provided on four corners of each of the upper substrate 10, the lower substrate 20 and the movable substrate 30; however, the present invention is not limited to this, and number and shape of the magnets M are arbitrary. Moreover, the magnets M may be pasted onto the surfaces of the respective substrates without being embedded into the respective substrates.

Moreover, the electret film 31 is not limited to the case of holding the negative electric charges, and may hold positive electric charges. Furthermore, the electret film 31 may be a bipolar electret film, in which the negative electric charges are held on one surface, and the positive electric charges are held on the other surface.

Furthermore, a moisture-proof film that covers the surface of the electret film 31 may be provided. If the electret film 31 is covered with the moisture-proof film, such a phenomenon can be reduced that the electric charges of the electret film 31 are attenuated by moisture in the air, and the electric power generation efficiency is enhanced.

Moreover, in the case where the electret film 31 is a plate-like member having an appropriate thickness and adequate strength, then the movable substrate 30 becomes unnecessary, and the magnets M may be provided on such a plate-like electret film 31.

Moreover, in this embodiment, the pair of electrodes 11 and 21 and the electret film 31 have the rectangular shape; however, the present invention is not limited to this, and for example, each thereof may be formed into a variety of shapes such as a circular plate shape.

Furthermore, if the electret film 31 can be vibrated in the direction of the axis passing though the pair of electrodes 11 and 21, then the electrodes 11 and 21 may be arranged in any manner, and for example, the electret film 31 may be vibrated so as to be moved horizontally.

Moreover, it is a matter of course that, besides the above, specific detailed structures and the like are also changeable as appropriate.

Next, an illustrative description is made of electronic instruments using the electric power generation device of the above-described embodiment.

Figure 11:
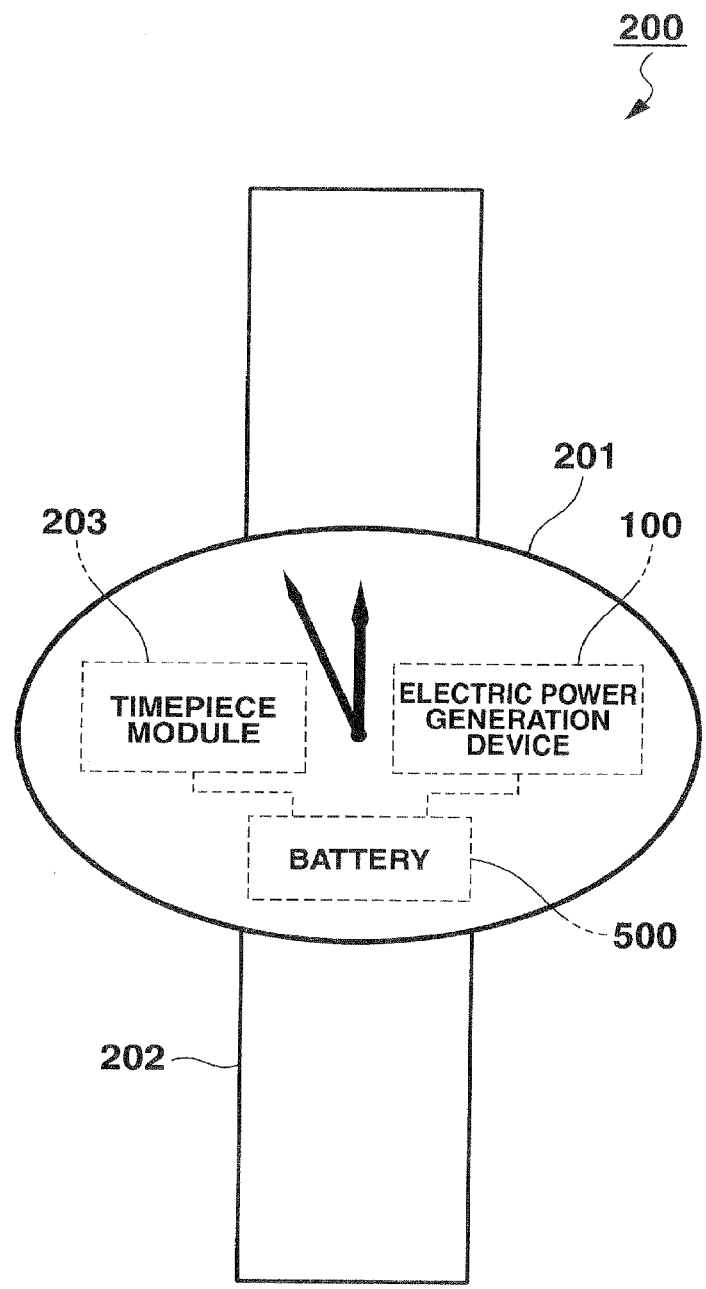
FIG. 11 is a plan view showing a schematic configuration of a wrist watch using the electric power generation device of the present invention.

FIG. 11 is a plan view showing a schematic configuration of a wrist watch 200 as an electronic instrument using the electric power generation device 100 of the present invention.

As shown in FIG. 11, the wrist watch 200 includes: a case 201; and a band 202 connected to the case 201. In the case 201, there are mounted: the electric power generation device 100; a battery 500; and a timepiece module 203. The electric power generation device 100, the battery 500 and the timepiece module 203 are electrically connected to one another.

As described above, the above-mentioned electric power generation device 100 is mounted in the wrist watch 200. Accordingly, a person who wears the wrist watch 200 swings the arm, whereby the electric power generation device 100 can generate electric power, can store the generated electric power in the battery 500, and can supply the electric power, which is stored in the battery, to the timepiece module 203. Hence, run out of the battery of the wrist watch 200 in use can be surely prevented.

Figure 12:
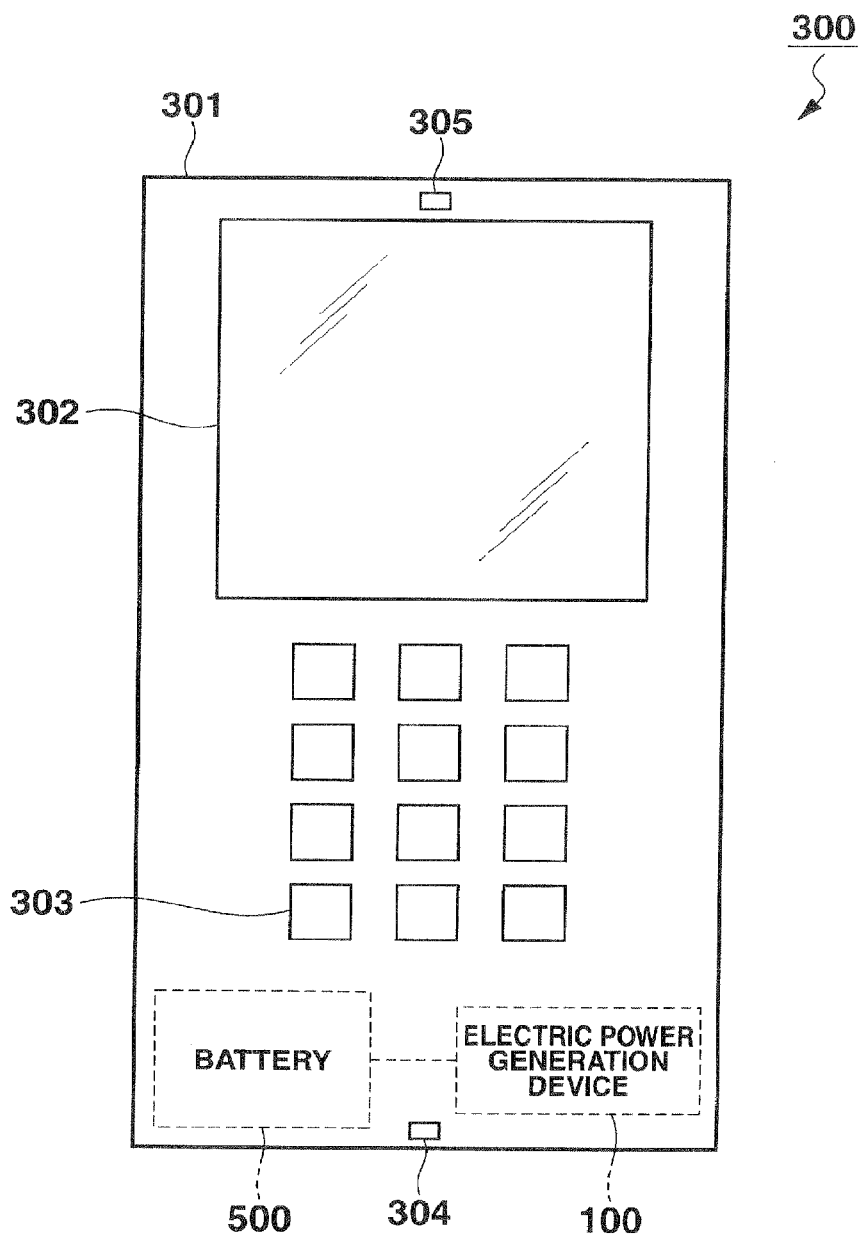
FIG. 12 is a plan view showing a schematic configuration of a cellular phone using the electric power generation device of the present invention.

FIG. 12 is a plan view showing a schematic configuration of a cellular phone 300 as an electronic instrument using the electric power generation device 100 of the present invention.

As shown in FIG. 12, the cellular phone 300 includes: a case 301; and a display screen 302, dial buttons 303, a microphone 304, and a speaker 305, which are installed in the respective portions of the case 301. Then, in the case 301, there are provided: the electric power generation device 100; the battery 500; and a control plate (not shown) in which a control circuit that controls the cellular phone 300 is provided. The electric power generation device 100, the battery 500 and the control plate (not shown) in which the control circuit is provided are electrically connected to one another.

As described above, the above-mentioned electric power generation device 100 is mounted in the cellular phone 300. Accordingly, the cellular phone 300 is swung, whereby the electric power generation device 100 can generate electric power, can store the generated electric power in the battery 500, and can operate the cellular phone 300 by using the electric power stored in the battery 500. Hence, even in the case where the cellular phone cannot be charged from an external power supply, the cellular phone can be charged with the electric power generation device 100 built therein.

Figure 13:
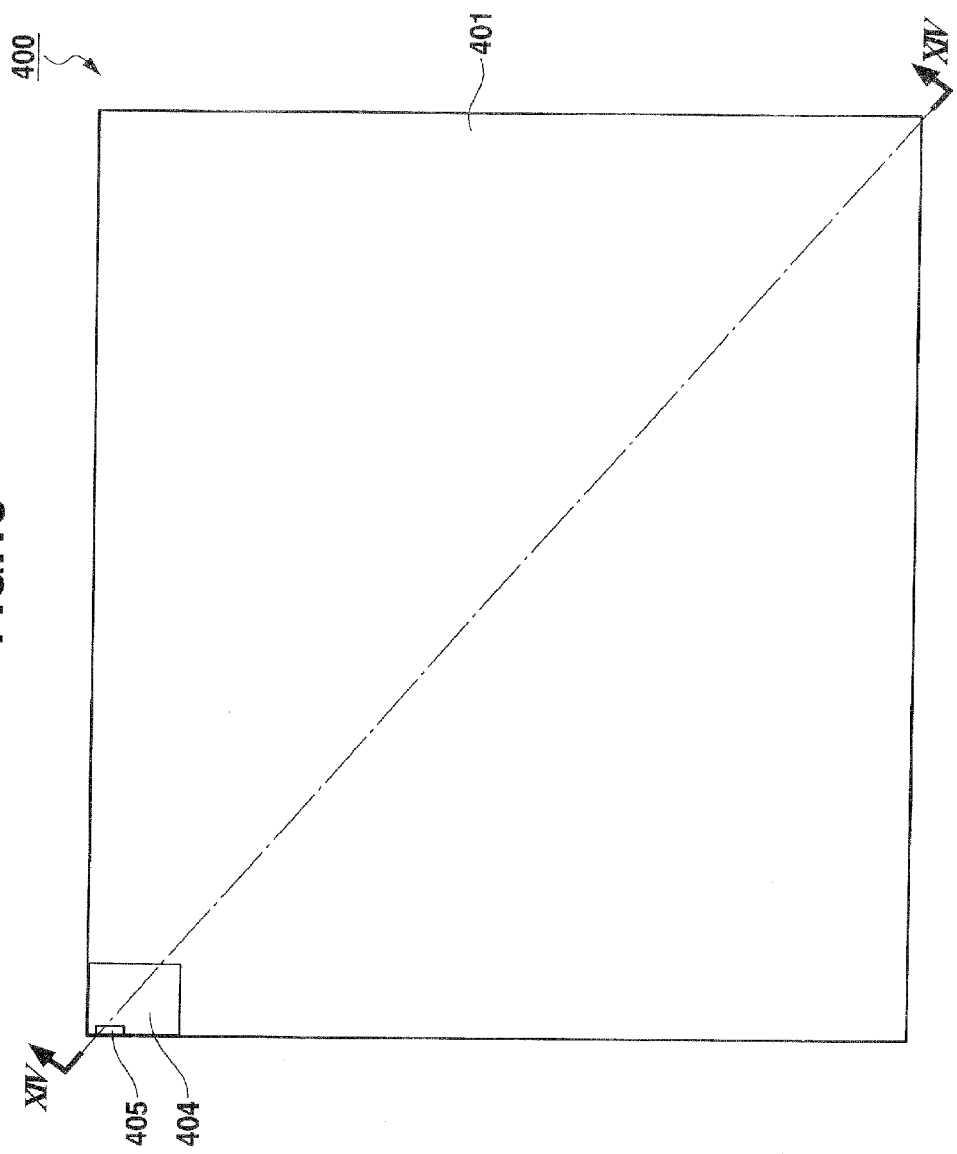
FIG. 13 is a plan view showing a schematic configuration of an electric power generation mat using the electric power generation device of the present invention.
Figure 14:
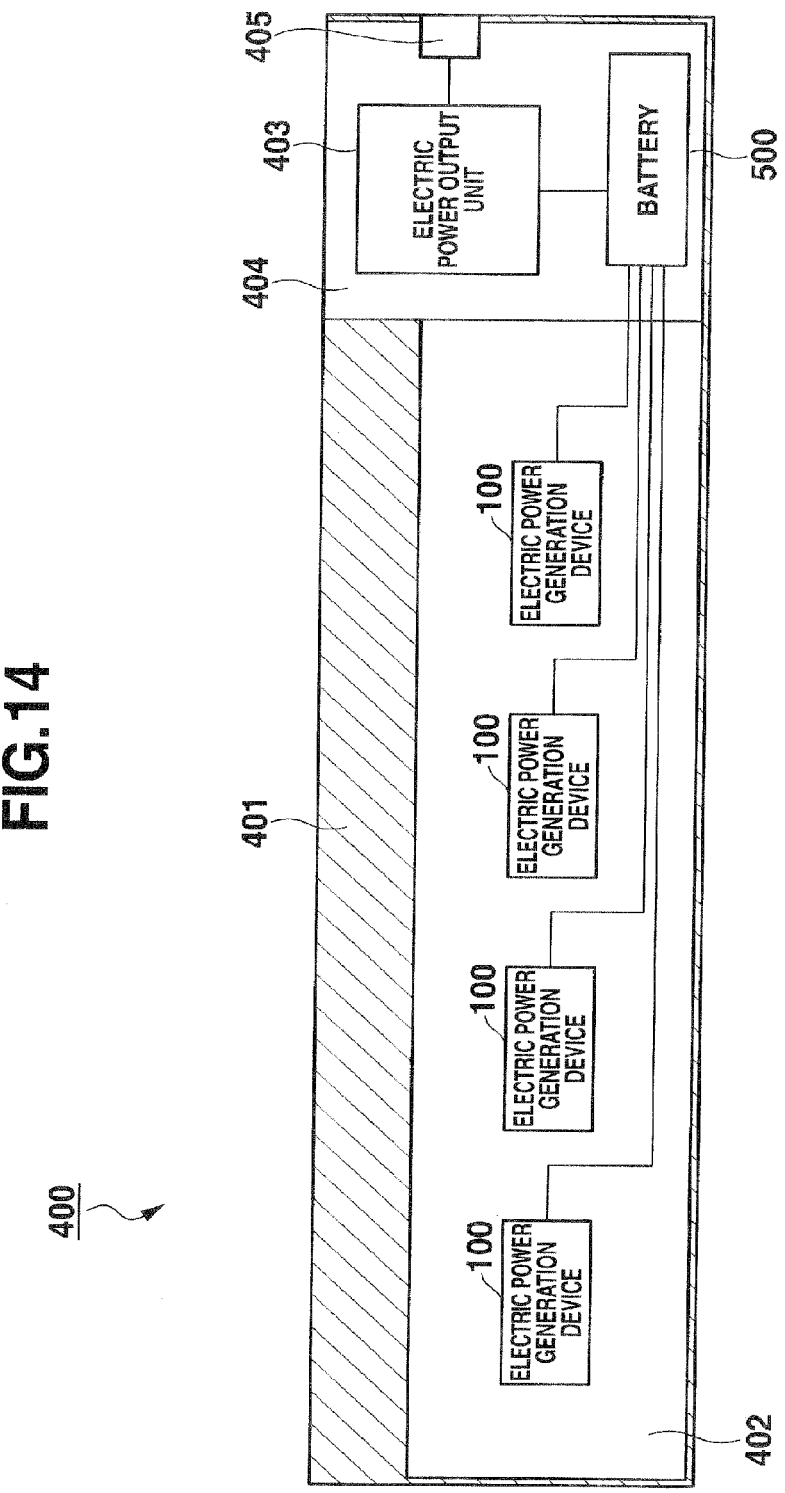
FIG. 14 is a cross-sectional view showing a schematic configuration of the electric power generation mat when viewed from a cutting plane line XIV-XIV of FIG. 13.

FIG. 13 is a plan view showing a schematic configuration of an electric power generation mat 400 as an electronic instrument using the electric power generation device 100 of the present invention. FIG. 14 is a cross-sectional view showing a schematic configuration of the electric power generation mat 400 when viewed from a cutting plane line XIV-XIV of FIG. 13.

As shown in FIG. 13 and FIG. 14, in the electric power generation mat 400, on an end portion thereof, a case 404 is provided. In the case 404, an electric power output unit 403 is provided, which includes: the battery 500; and a terminal portion 405 such as a plug socket and a USB connection portion.

Moreover, as shown in FIG. 14, the electric power generation mat 400 includes: a fabric portion 401; and an electric power generation device installation portion 402 arranged under the fabric portion 401. A plurality of the electric power generation devices 100 are installed in this electric power generation device installation portion 402.

Then, the battery 500 and the electric power output unit 403 in the case 404 and the electric power generation devices 100 in the electric power generation device installation portion 402 are electrically connected to each other. Electric power generated in the electric power generation devices 100 is stored in the battery 500.

As described above, the above-mentioned electric power generation devices 100 are mounted in the electric power generation mat 400. Accordingly, vibrations generated in such a manner that persons walk on the electric power generation mat 400 are converted into the electric power, and the electric power thus generated can be charged to the battery 500. Then, the electric power charged to the battery 500 can be supplied to other electronic instruments through the terminal portion 405 of the electric power output unit 403.

That is to say, this electric power generation mat 400 is installed at a place where persons move up and down, whereby the electric power can be naturally generated, and it becomes possible to store the generated electric power. Moreover, it is easy to carry the electric power generation mat 400, and accordingly, the electric power generation mat 400 can be arranged anew at a place where the electric power can be generated efficiently. Note that, since the vibrations generated when persons walk are utilized for the electric power generation, magnets M corresponding to a vibration cycle of several hertz (Hz) are recommended to be used for the electric power generation devices 100.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric power generation device comprising:
a pair of electrodes arranged opposite to each other; and
an electret member that is arranged between the pair of electrodes to be spaced apart from the pair of electrodes, and is provided to be movable in a direction of a perpendicular axis passing through the pair of electrodes;

a first fixed substrate on which one of the pair of electrodes is provided;

a second fixed substrate on which the other of the pair of electrodes is provided; and a movable substrate on which the electret member is provided, wherein:

elastic members which elastically support the first and second fixed substrates and the movable substrate are respectively interposed between the first fixed substrate and the movable substrate, and between the second fixed substrate and the movable substrate, and together with the electret member, the movable substrate vibrates in the direction of the perpendicular axis by elastic force of the elastic members.

2. The electric power generation device according to claim 1, wherein the elastic member is a spring member.

3. The electric power generation device according to claim 1, further comprising:

a holding member that holds the first and second fixed substrates at a predetermined interval, wherein:

a protruding piece with a shape protruding from a peripheral edge of the movable substrate is integrally formed on the movable substrate, and the protruding piece of the movable substrate is brought into point contact with the holding member.

4. The electric power generation device according to claim 3, wherein a planar shape of the protruding piece is a triangular shape, or a three-dimensional shape of the protruding piece is a conical shape.

5. The electric power generation device according to claim 3, wherein the holding member or the movable substrate is formed of an insulating material.

6. The electric power generation device according to claim 1, wherein a discharge prevention film made of an insulating material is provided on a surface opposed to the electret member without interposing the movable substrate in between, the surface being one of surfaces of the pair of electrodes on an inner surface side.

7. The electric power generation device according to claim 1, wherein wires for taking out electric charges induced to the pair of electrodes in response to movement of the electret member are connected to the pair of electrodes.

8. An electronic instrument comprising:

a battery that stores electric power generated by the electric power generation device according to claim 1, wherein the electronic instrument operates by using the electric power stored in the battery.

9. An electronic instrument comprising:

a battery that stores electric power generated by the electric power generation device according to claim 1; and an electric power output unit that supplies other electronic instruments with the electric power stored in the battery.

* * * * *